Patented Apr. 14, 1953

2,635,114

UNITED STATES PATENT OFFICE 2,635,114

POLYALKYLBENZENE CARBOXYLIC ACID AND PROCESS OF PREPARING IT

Maurice J. Schlatter, El Cerrito, Calif., assignor to California Research Corporation, San Francisco, Calif., a corporation of Delaware No Drawing. Application June 19, 1951, Serial No. 232,455

1 Claim. (Cl. 260—515)

The present invention is concerned with the production of a new and superior polyalkylbenzene carboxylic acid, namely, 3,5-di-tertiary-butylbenzoic acid.

Benzene carboxylic acids in general are valuable as intermediates in the production of various important chemicals such as modified alkyd resins, polymerizable vinyl esters, modifiers for unsaturated polyesters, specialty greases, plasticizers, surface-active agents, dyes, pharmaceuticals, and perfumery intermediates. For the production of modified alkyd resins, benzene carboxylic acids having high melting points in addition to chemical stability are particularly desirable since the resins obtained from them give a harder and glossier final product characterized by greater durability under normal usage.

Pure benzene carboxylic acids having alkyl groups of predetermined structure in specific isomeric arrangement on the benzene nucleus which would be useful in present-day applications have heretofore been very difficult to obtain in good yields. Alkylation of benzoic acid or its homologues with a specific alkylating agent has proved impractical because of the inherent resistance of benzene carboxylic acids to the direct introduction of nuclear alkyl groups.

It has now been found that essentially pure 3,5-di-tertiary-butylbenzoic acid, a novel benzene carboxylic acid distinguished by its chemical resistance to nuclear attack and unusually high melting point, can be prepared in excellent yields by alkylating toluene, ethylbenzene or other similar short-chain alkyl benzene with a tertiary-butylating agent and oxidizing the 3,5-di-tertiary-butyltoluene, 3,5-di-tertiary-butylethylbenzene or other 3,5-di-tertiary-butylalkylbenzene thus obtained. This is a surprising discovery since, in general, polyalkylbenzenes containing alkyl groups of more than one carbon atom cannot be oxidized cleanly to give a single product.

The 3,5-di-tertiary-butylbenzoic acid of this invention is unique because, due to the steric hindrance of the bulky symmetrically-arranged tertiary-butyl groups, all the ring positions are essentially blocked. It thus resists further substitution and chemical attack on the benzene nucleus. This chemical stability derived from its unusual molecular structure makes the 3,5-di-tertiary-butylbenzoic acid particularly useful as an intermediate in chemical reactions where it is desirable to avoid the formation of by-products. For example, vinyl esters of aromatic acids generally form insoluble, infusible polymers because of cross-linking through the aromatic nuclei. This is not possible with the 3,5-di-tertiary-butylbenzoic acid of the present invention which, accordingly, allows preparation of valuable soluble and fusible vinyl ester polymers. The unusually high melting point of the 3,5-di-tertiary-butylbenzoic acid which is much higher than that of any other known alkyl benzene carboxylic acid of equivalent molecular weight also makes it very desirable for the production of modified alkyd resins where hardness, depth of gloss and durability of the final product are important factors.

The process of preparing 3,5-di-tertiary-butylbenzoic acid, according to the present invention, is easily carried out. Materials which are commonly available are used as reactants. When the reactants are properly combined pursuant to the method of this invention, more particularly described hereinafter, the reaction proceeds in a surprisingly straight-forward manner to produce the 3,5-di-tertiary-butylbenzoic acid in good yield.

In preparing the 3,5-di-tertiary-butyltoluene and 3,5-di-tertiary-butylethylbenzene hydrocarbon intermediates, according to this invention, either toluene, ethylbenzene or a short-chain alkyl benzene having at least one hydrogen atom on the carbon of the alkyl group adjacent to the benzene nucleus may be employed as starting material. Toluene is preferred since the methyl group is oxidized directly to the desired carboxyl group of the final product with lower consumption of the oxidant. Furthermore, ethylbenzene has a tendency to form a variety of side reaction products not obtained when toluene is tertiary-butylated.

Any tertiary-butylating agent may be employed to produce the di-tertiary-butyl substituted toluene and ethylbenzene. Suitable alkylating materials include isobutene, tertiary-butyl-chloride, tertiary-butyl alcohol, tertiary butyl mercaptan and di-isobutylene. Tertiary-butyl chloride and isobutene are preferred, particularly the latter, because of their ready availability.

From about 1 to about 3 moles of tertiary-butylating agent per mole of toluene or ethylbenzene are employed in the alkylation reaction. Either smaller or larger proportions may be used under certain conditions but ordinarily the molar ratio of tertiary-butylating agent to toluene or ethylbenzene should not be greater than 5 in order to avoid butene polymerization and the formation of undesirable complexes. The optimum mole ratio of tertiary-butylating agent to toluene or ethylbenzene differs with different agents; for example, a large excess of tertiary-butyl chloride may generally be employed, because the unreacted tertiary-butyl chloride is not altered and may be recovered and recycled. Isobutene, on the other hand, is polymerized and involved in other side reactions which decrease the yield of the desired product and for this reason is best used in a ratio of 1–2 moles per mole of monoalkylbenzene. In such cases good ultimate yields are obtained by recycle of the mono-tertiary-butylalkylbenzene obtained in the reaction. For present purposes, it has been found that about 1.5 to 2 moles of tertiary-butylating agent per mole of toluene or ethylbenzene is most satisfactory.

The alkylation reaction is desirably carried out in the presence of a catalyst of the type of hydrogen fluoride, aluminum chloride, boron trifluoride, aluminum bromide, ferric chloride, phosphoric acid, etc. Temperatures in the range of from about −20° C. to about 125° C. may be employed. When the reaction is carried out in the presence of an hydrogen fluoride catalyst, as presently preferred, temperatures in the range of from about 0° C. to about 50° C. are particularly satisfactory. Although atmospheric, superatmospheric or subatmospheric pressures may be employed during the alkylation, pressures above atmospheric in the range of from about 30 to about 50 pounds per square inch gauge are more desirable when an hydrogen fluoride catalyst is used in order to avoid vaporization of the catalyst.

The 3,5-di-tertiary-butyltoluene and 3,5-di-tertiary-butylethylbenzene may be recovered from the alkylate reaction mixture by methods such as fractional distillation, crystallization, solvent extraction, etc. For present purposes, a combination fractional distillation and crystallization has been found most satisfactory. In this latter type of separation, it is possible to obtain essentially pure 3,5-di-tertiary-butyltoluene because of the characteristic high melting point of this material. 3,5-di-tertiary-butylethylbenzene does not crystallize readily, but this material can be conveniently obtained by fractional distillation in a purity suitable for oxidation.

The 3,5-di-tertiary-butyltoluene and 3,5-di-tertiary-butylethylbenzene may be oxidized to 3,5-di-tertiary-butylbenzoic acid by the use of various alkaline and weakly acid oxidizing agents. Strongly acid oxidizing agents such as mixtures of chromic acid and sulfuric acid are preferably avoided to prevent acid catalyzed de-alkylation reactions. Oxidizing agents such as alkaline permanganate, sulfur and aqueous alkali mixtures, dilute nitric acids, etc. may be employed. Oxidation with air or oxygen in the presence of catalysts such as cobalt and copper Soligens, manganese oxide, vanadium oxide, tin vanadate, etc. may be used.

When the oxidation is carried out by means of alkaline permanganate or dilute nitric acid, the 3,5-di-tertiary-toluene or 3,5-di-tertiary-butylethylbenzene is mixed in the vessel with the oxidizing agent and heated, usually at a temperature within the range of from about 80° C. to about 100° C. In oxidizing the 3,5-di-tertiary-butyltoluene and the 3,5-di-tertiary-butylethylbenzene with oxygen or air in the presence of oxidation catalysts, a liquid phase process operating at from about 110 to 150° C. is preferred. However, vapor phase oxidations may be successfully carried out at temperatures generally not exceeding about 600° C.

The 3,5-di-tertiary-butylbenzoic acid may be separated from the reaction mixture produced in the oxidation step by means such as fractional distillation, solvent extraction, crystallization, etc. Separations by crystallization are particularly effective because of the unusually high melting point of the 3,5-di-tertiary-butylbenzoic acid compared to carboxylic acids of equivalent molecular weight. By such a procedure it is possible to obtain essentially pure 3,5-di-tertiary-butylbenzoic acid.

The following illustrative examples relating to the preparation of 3,5-di-tertiary-butylbenzoic acid according to this invention are submitted:

*Example I.—Preparation of 3,5-di-tertiary-butyltoluene by alkylation of toluene with isobutene*

1104 parts of toluene were placed in a flask equipped with a mechanical stirrer, gas addition tube, and vent tube. The flask was then immersed in an ice bath and 354 parts of liquid hydrogen fluoride were added. Over a period of 6 hours 898 parts of isobutene were introduced. The reaction mixture was cooled and neutralized with potassium hydroxide. The hydrocarbon phase and ether extract of the aqueous phase were dried over calcium chloride and distilled. The final product had the following analysis:

|  | Parts by Weight | Percent Yield by Weight Based on Toluene Charged |
|---|---|---|
| Toluene | | |
| Mono-tertiary-butyltoluene | 1,041.5 | 58.5 |
| 3,5-di-tertiary-butyltoluene | 630.0 | 25.7 |
| High-boiling products | 137.7 | |

The 3,5-di-tertiary-butyltoluene when re-crystallized from ethanol melted at 31.0–31.9° C. It had a boiling point of 234–237° C. at 760 mm. Hg.

*Example II.—Preparation of 3,5-di-tertiary-butyltoluene by alkylation of mixed tertiary-butyltoluenes with tertiary-butyl chloride*

A mixture of about 357 parts of meta-tertiary-butyltoluene and 357 parts of para-tertiary-butyltoluene was cooled to 0° C. in a copper flask immersed in an ice bath. About 198 parts of liquid hydrogen fluoride were then added. The mixture was agitated vigorously and about 276 parts of tertiary-butyl chloride were added over a period of one hour. After stirring for about 3 hours, the product was distilled. The crude product had the following analysis:

|  | Parts by Weight | Percent Yield by Weight Based on Unrecovered Tertiary-butyltoluenes |
|---|---|---|
| Toluene | | |
| Mono-tertiary-butyltoluenes | 232 | |
| 3,5-di-tertiary-butyltoluene | 550 | 95 |

A sample of re-crystallized 3,5-di-tertiary-butyltoluene was found to have a melting point of 31.4° C.

*Example III.—Alkylation of toluene with tertiary-butyl chloride in the presence of aluminum chloride catalyst*

Approximately 200 parts of anhydrous aluminum chloride were placed in a flask equipped with stirrer, reflux condenser, thermometer and addition funnel. 276 parts of toluene were added and the mixture stirred for about 30 minutes to dissolve a large portion of the aluminum chloride. 588 parts of tertiary-butyl chloride were added over a period of 2½ hours while regulating the rate of addition so as to keep the temperature below about 45° C. and the hydrogen chloride evolution at a moderate level. A viscous product was obtained which had the following analysis:

|  | Parts by Weight | Percent Yield by Weight Based on Toluene Charged |
|---|---|---|
| Tertiary-butyltoluenes | 77 | 17 |
| Di-tertiary-butyltoluenes | 62 | 10 |
| Viscous oil (polybutenes, etc.) | 86 | |

*Example IV.—Preparation of 3,5-di-tertiary-butylethylbenzene*

Isobutene (approximately 2.5 parts per minute) was passed into a vigorously stirred mixture of 1274 parts of ethylbenzene and 333 parts of liquid hydrogen fluoride contained in a copper flask immersed in an ice bath. After six hours, gas addition was stopped and stirring continued for thirty minutes. The reaction mixture was poured on crushed ice, neutralized with excess potassium hydroxide, separated, dried and distilled through a 30 plate column. Mono-tertiary-butylethylbenzenes (B. P. 204–212° C. at 760 mm.) were obtained in 41% yield based on ethylbenzene charged, 3,5-di-tertiary-butylethylbenzene (B. P. 128–131° C. at 20 mm. pressure) was obtained in 20% yield. A center cut product had the following physical properties: B. P. 130.0° C. at 20 mm.; $n_D^{20}$ 1.4890; $d_4^{20}$ 0.8575. The 3,5-di-tertiary-butylethylbenzene structure was confirmed by comparison of the infrared and ultraviolet spectra with those of other 1,3,5-trialkylbenzenes.

*Example V.—Preparation of 3,5-di-tertiary-butylbenzoic acid*

344 parts of 3,5-di-tertiary-butyltoluene, 1200 parts of pyridine, 600 parts of water and 142 parts of potassium hydroxide were mixed in a three-neck flask equipped with mechanical stirrer, reflux condenser, thermometer, and addition funnel and heated to a temperature of about 95° C. 666 parts of potassium permanganate were added over over a 3-hour period to the mixture with vigorous stirring while maintaining the temperature at about 95° C. After the addition was complete, stirring was continued for another 1½ hours at 95° C. The manganese dioxide formed was filtered off and the hydrocarbon layer separated was combined with ether extracts of the aqueous phase. Distillation of the hydrocarbon product gave about 80 parts of unreacted 3,5-di-tertiary-butylbenzene.

The aqueous phase obtained in the above process was concentrated on a steam plate and the crude acid precipitated by acidifying with hydrochloric acid. Additional crude acid entrained in the manganese dioxide precipitate was recovered by suspending the manganese dioxide precipitate in dilute hydrochloric acid and adding sodium bisulfite until the dark-brown particles were all dissolved. A white solid remaining in suspension was collected on a filter, washed with water, redissolved in potassium hydroxide, reprecipitated with acid, filtered, washed with water and dried. The combined portions of crude acid were recrystallized from benzene and 197 parts of 3,5-di-tertiary-butylbenzoic acid were obtained. The yield amounted to about 65 per cent of theoretical based on unrecovered hydrocarbon.

The 3,5-di-tertiary-butylbenzoic acid obtained by the above experiment was in the form of colorless needles characterized by the following inspections:

Melting point, 172.6–173.0° C.

Neutral equivalent, 236 compared to calculated of 234.3.

Carbon and hydrogen analysis:
 C=77.14%; 77.27%
 H= 9.53%; 9.51%

Theoretical:
 C=76.88%
 H= 9.46%

The anilide of 3,5-di-tertiary-butylbenzoic acid was prepared in the usual manner. Recrystallization of the anilide from ethanol gave colorless needles melting at 203–204° C.

In the above experiments the proportions specified are on a weight basis unless otherwise indicated.

I claim:

3,5-di-tertiary-butylbenzoic acid.

MAURICE J. SCHLATTER.

References Cited in the file of this patent

UNITED STATES PATENTS

| Number | Name | Date |
|---|---|---|
| 2,578,654 | Hearne et al. | Dec. 18, 1951 |